United States Patent [19]

Molloy

[11] Patent Number: 4,554,758

[45] Date of Patent: Nov. 26, 1985

[54] TUNNEL TRAP

[75] Inventor: Michael P. Molloy, Cedar Park, Tex.

[73] Assignees: Bobby Lockhart; O. D. Bradsher, Jr., both of Austin, Tex.; part interest to each

[21] Appl. No.: 535,286

[22] Filed: Sep. 23, 1983

[51] Int. Cl.⁴ .................. A01M 23/08; A01M 23/18
[52] U.S. Cl. ............................................. 43/61; 43/67
[58] Field of Search ................. 43/61, 64, 67, 66, 74

[56] References Cited

U.S. PATENT DOCUMENTS

| | | | |
|---|---|---|---|
| 1,488,312 | 3/1924 | Bronson | 43/61 |
| 2,437,020 | 3/1948 | Ford | 43/61 |
| 4,418,493 | 12/1984 | Jordan | 43/61 |

FOREIGN PATENT DOCUMENTS

| | | |
|---|---|---|
| 479214 | 2/1938 | United Kingdom . |
| 593241 | 10/1947 | United Kingdom . |
| 1382063 | 1/1975 | United Kingdom . |
| 1400301 | 7/1975 | United Kingdom . |
| 2056244 | 3/1981 | United Kingdom . |

Primary Examiner—Nicholas P. Godici
Assistant Examiner—C. McKee
Attorney, Agent, or Firm—Roylance, Abrams, Berdo & Goodman

[57] ABSTRACT

A tunnel trap comprising an elongated tubular housing, a rear cover closing the housing rear end and a door pivotally mounted adjacent the front end of the housing. The door is pivotally mounted for movement between an open position permitting access to the housing interior and a closed position closing access to the housing interior from the front end. Springs bias the door towards the closed position. Latches releasably engage the door to maintain the door in an open position against the bias of the springs or in a closed position for locking the door. A trigger mechanism is coupled to the latch maintaining the door open to release such latch permitting movement of the door towards its closed position.

15 Claims, 8 Drawing Figures

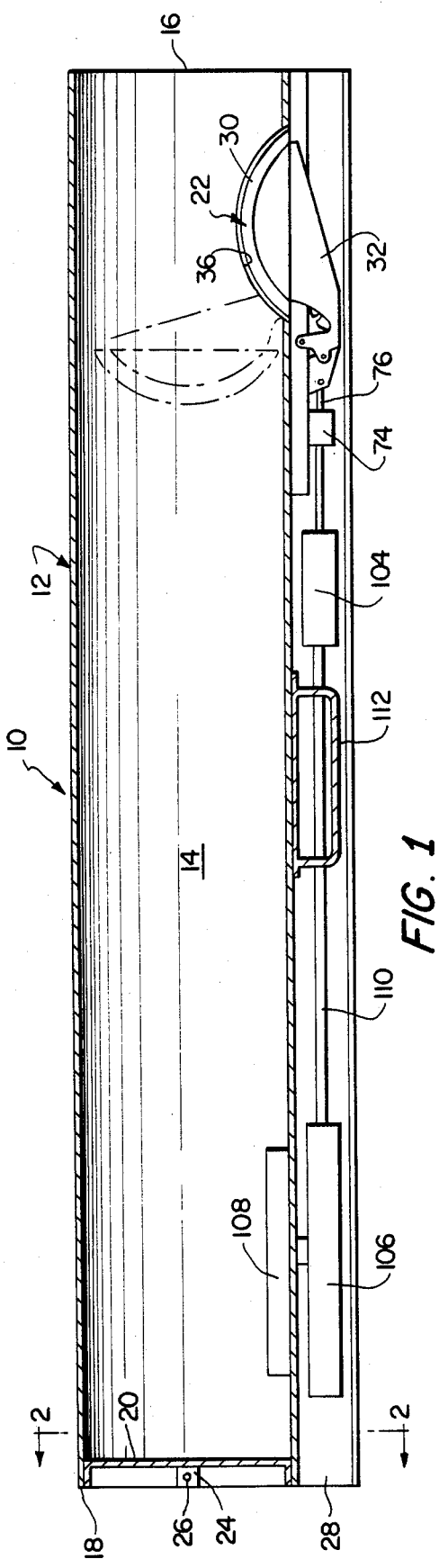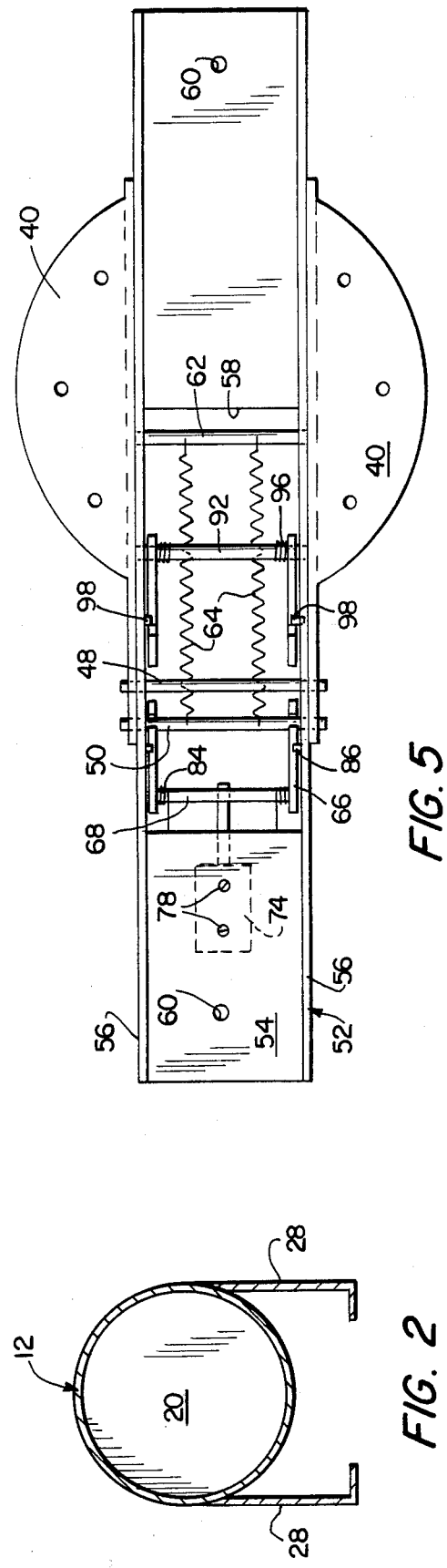

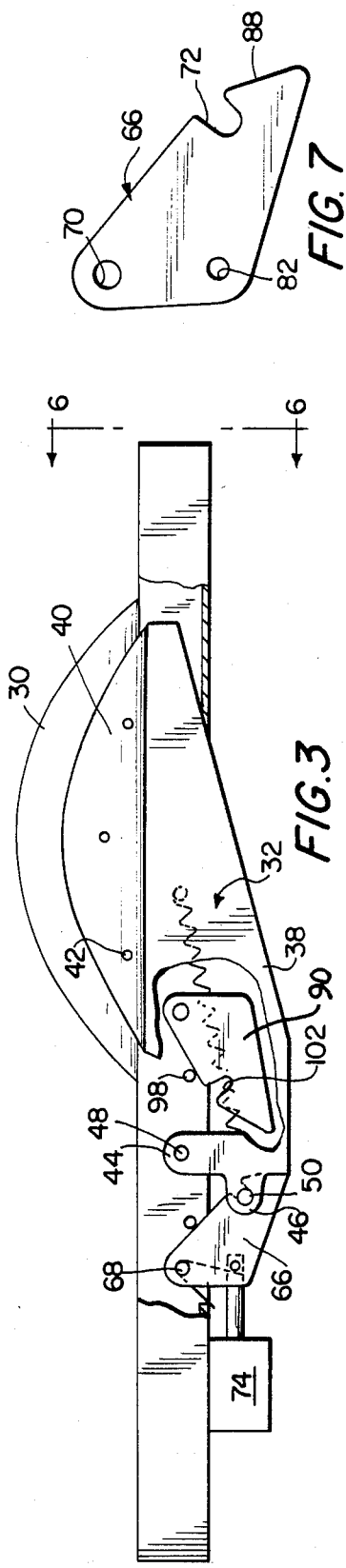
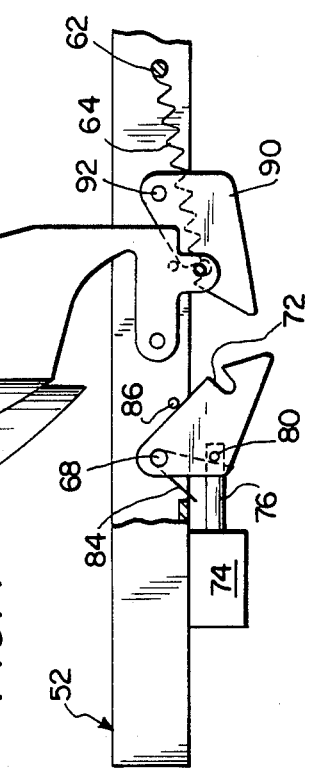
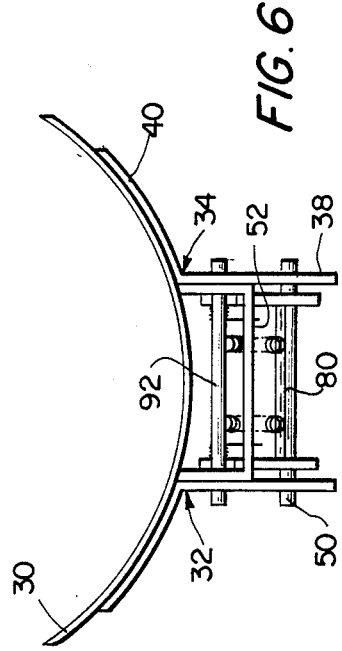

TUNNEL TRAP

FIELD OF THE INVENTION

The present invention relates to a trap formed generally in the shape of a tunnel and primarily intended for capturing relatively small animals. More specifically, the present invention relates to a trap having a door set in an open position for luring the victim into its housing, and then closed by a trigger mechanism activated by presence of the victim within the trap.

BACKGROUND OF THE INVENTION

Numerous types of traps for capturing small animals are available. However, conventional traps are relatively cumbersome, complex to operate and expensive to manufacture. Moreover, such traps do not provide an effective container for transporting the animal without exposing the person carrying it to possible animal bites, stings and other dangers. Persons using these traps have also been injured in setting and accidentally contacting the traps. These traps have also been dangerous for domestic pets.

SUMMARY OF THE INVENTION

Accordingly, a primary object of the present invention is to provide a tunnel trap which can be used in populated areas without endangering people or domestic pets.

Another object of the present invention is to provide a tunnel trap which can be employed for transporting the victim upon capture without exposing the carrier to animal bite, sting, spray or disease, and without harming the victim.

A further object of the present invention is to provide a lightweight trap of rugged construction which can be simply and inexpensively operated and manufactured.

A still further object of the present invention is to provide a trap in the shape which would lure potential victims therein.

The foregoing objects are basically attained by a tunnel trap comprising an elongated tubular housing defining an interior space, a rear cover closing the rear end of the housing and a door pivotally mounted in the housing adjacent its front end. The door is movable between an open position permitting access to the housing interior space through the front end and a closed position closing the housing adjacent its front end. A spring mechanism biases the door towards its closed position. Latches, releasably engagable with the door, maintain the door in its open position against the bias of the spring or in its closed position to lock the door. A trigger mechanism is coupled to the latch maintaining the door in its open position to release the latch from the door permitting the door to move toward its closed position under the action of the spring.

By forming the tunnel trap in this manner, the trap can be easily and safely employed for trapping a wide variety of animals. Additionally, such tunnel trap is simple and inexpensive to manufacture and operate.

The tubular housing lures animals which tend to hide in tunnels or other hollow objects. After the animal has been caught in the trap, the housing provides an effective device for transporting the animal without exposing the carrier to animal bite or disease or any other adverse contact with the animal. For example, animals, such as skunks can be so retained within the tubular housing due to its size and shape, to prevent them from discharging fluids.

The door and mechanism for closing it provides a passive system preventing injury both to the captured animal and to the trapper. Additionally, the trap will not present a danger to domesticated pets or people who accidentally contact the trap. Since the device is self-contained, it can be located anywhere desired.

Other objects, advantages and salient features of the present invention will become apparent from the following detailed description which, taken in conjunction with the annexed drawings, discloses a preferred embodiment of the present invention.

BRIEF DESCRIPTION OF THE DRAWINGS

Referring to the drawings which form a part of this original disclosure:

FIG. 1 is a side elevational view, partially in section, of a tunnel trap in accordance with the present invention;

FIG. 2 is a front elevational view in section taken along lines 2—2 in FIG. 1;

FIG. 3 is an enlarged, side elevational view of the door and its operating mechanisms of the tunnel trap of FIG. 1, with the door in its open position;

FIG. 4 is a partial, side elevational view of the door and its operating mechanisms with the door in its closed position;

FIG. 5 is a top plan view of the door and its operating mechanisms of the tunnel trap of FIG. 1 without the door panel;

FIG. 6 is an end elevational view taken along lines 6—6 of FIG. 3; and

FIGS. 7 and 8 are enlarged, side elevational views of the latches for the door operating mechanisms.

DETAILED DESCRIPTION OF THE PREFERRED EMBODIMENTS OF THE INVENTION

Referring initially to FIG. 1, the tunnel trap 10 of the present invention comprises an elongated tubular housing 12 defining an interior space 14 and a front end 16 and a rear end 18 located at longitudinally opposite ends of the housing. Rear end 18 is closed by a rear cover 20. A door assembly 22 is pivotally mounted adjacent housing front end 16 for movement between an open position (illustrated in full lines in FIG. 1) and a closed position (illustrated in phantom lines in FIG. 1).

Elongated tubular housing 12 is a right cylinder having a length and transverse diameter chosen in view of the size of the animal being sought. Typically, the tube has an outside diameter of eight inches and is formed of seamless drawn aluminum tubing. A typical length is 50 inches. The aluminum tubing provides high mechanical strength while being lightweight and relatively corrosion resistant. This housing functions as a lure, an enclosure for trapping the animals and a container for transporting the animals after capture.

Rear cover 20 comprises a generally circular plate which is suitably secured across housing rear end 18. For example, cover 20 can have a plurality of tabs 24 extending therefrom through which fasteners extend and are secured to the housing.

As more clearly illustrated in FIG. 2, two L-shaped support members 28 are fixed to and depend from diametrically opposite sides of housing 12. The support members support the housing on the ground and provide space within which the components for operating door assembly 22 are contained. Thus, members 28 support the housing, add to the structural integrity of the housing and provide a container for various components of tunnel trap 10.

Door assembly 22 comprises a door panel 30 and first and second door brackets 32, 34 as illustrated in FIGS. 3-6. Door panel 30 comprises a section of housing 12 which has been removed to form opening 36 in a lateral side thereof. Thus, door panel 30 is generally circular in top plan view and arcuate in side view (FIG. 6). When the door panel is in its open position as illustrated in FIG. 1, it readily conforms to the inner surface of housing 12, thereby masking its presence. When moved to its closed position, the door assembly closes housing first end 16 preventing escape of the captured animal.

Brackets 32 and 34 are mirror images of each other with each comprising a planar, vertical portion 38 and an arcuate portion 40. Each arcuate portion conforms to the shape of the outer surface of door panel 30 and has a plurality of openings therein receiving fasteners 42 for fixedly coupling the door panel to the brackets. Each vertical portion 38, remote from its arcuate portion 40, as illustrated in FIG. 3, has a first projection 44 and a second projection 46. Projections 44 are connected by a pivot pin 48, while projections 46 are connected by a latch pin 50.

The door assembly is mounted on a generally U-shaped support member 52 having a base 54 and two legs 56 extending therefrom. Base 54 has a central aperture 58. The support member is suitably fixed to the exterior of cylindrical housing 12 adjacent opening 36. Holes 60 formed in base 54 receive fasteners for fixing the support member to the tunnel trap housing such that base 54 is located remote from the exterior surface of the housing.

Door brackets 32 and 34 are located on the opposite outer surfaces of legs 56, with pivot pin 48 extending through aligned holes in support member legs 56. By locating the brackets on the outer surfaces, the brackets and door panel can pivot freely without interfering with the support member. Pivot pin 48 is spaced from latch pin 50 such that the latch pin is located below the support member whether the door is in its open or closed position.

A pin 62 extends between support member legs 56 over aperture 58. Tension springs 64 extend between and are coupled at their opposite ends to pin 62 and to latch pin 50 of door brackets 32, 34. Springs 64 biases door assembly 22 toward its closed position illustrated in FIG. 4.

Door assembly 22 is retained in its opened position against the bias of springs 64 by a pair of down lock latches 66. The configuration of each of these latches is illustrated in detail in FIG. 7. Latches 66 are hingedly coupled to inner surfaces of legs 56 within opening 58 by a hinge pin 68. Hinge pin 68 extends through pivot holes 70 in the latches and is received in the support member legs 56. The down lock latches are generally triangular in shape and have an arcuate notch 72 for receiving latch pin 50.

A solenoid 74 with a reciprocating rod 76 is mounted to the underside of support member base 54 by fasteners 78. The end of reciprocating rod 76 remote from solenoid 74 is pivotally coupled to a release pin 80 which is rotatably mounted in holes 82 in latches 66. Torsional springs 84 bias latches 66 about their hinge pin 68 against stops 86 formed on the inner surfaces of legs 56. Stops 86 are so located that they retain latches 66 in a position in which they releasably secure door assembly 22 in its open position. A cam surface 88 is formed on the edge of each latch 66 adjacent to and extending from notch 72.

Door assembly 22 is locked in its closed position to prevent escape of the captured animal by a pair of up lock latches 90. Latches 90 are pivotally mounted on inner surfaces of legs 56 and within aperture 58 by an up lock hinge pin 92. Pin 92 extends between legs 56 and through holes 94 in the latches. Torsional springs 96 having opposite ends coupled to the latches 90 and to hinge pin 92 bias the latches about hinge pin 92 against stops 98 projecting inwardly from legs 56. A cam surface 100 is formed on the edge of each latch 90 facing a latch 66. Each cam surface extends from an arcuate notch 102 formed in each latch 90 for receiving latch pin 50 when the door is in its closed position.

Solenoid 74 is electrically coupled to trigger electronic assembly 104, a battery supply 106 and a membrane trigger switch 108. Assembly 104, supply 106 and switch 108 are generally of conventional construction, and thus, are illustrated graphically. Suitable wiring 110 is provided to make the required electrical connections.

The membrane switch is located adjacent rear end 18, and is approximately 4×8 inches and is of a type that requires a pressure of approximately eight ounces per square inch to actuate. Actuation of switch 108 actuates solenoid 74 to momentarily retract, reciprocating pin 76.

Battery supply 108, assembly 104, solenoid 74 and door assembly 22 are all located on the exterior of the housing between support members 28. The battery supply and electronic assembly are suitably sealed to prevent damage by water or other contaminants. Additionally, a handle may be provided to facilitate transporting of the device, with or without a captured animal therein.

In operation, door assembly 22 is initially cocked or latched in its open position, as illustrated in FIG. 3, to permit an animal to enter housing 12 through open end 16. In the open position, latch pin 50 is retained within notches 72 of up lock latches 66.

After an animal enters housing 12 and mounts switch 108, the trigger mechanism is actuated. Actuation of the trigger mechanism supplies electrical power from battery supply 108 through electronic assembly 104 to solenoid 74 in order to retract reciprocating pin 76. As pin 76 retracts, down lock latch 66 is caused to rotate clockwise, as illustrated in the drawings, about hinge pin 68 and against the bias of torsional springs 84. Clockwise rotation of latches 66 withdraws notch 72 from latch pin 50 permitting door assembly 22 to pivot about pivot pin 48 under the bias of springs 64 to the closed position illustrated in full lines in FIG. 4 and in phantom lines in FIG. 1. As door assembly 22 pivots upwardly towards its closed position, latch pin 50 contacts cam surfaces 100 of up lock latches 90 pivoting latches 90 in a counterclockwise direction about hinge pin 90 and against the bias of torsional springs 96. This movement of latches 90 and door assembly 22 permits the door assembly to move to its fully closed position and for the latch pin 50 to be received in notches 102. When latches 90 return to their normal position against stops 98 with latch pin 50 received in notches 102, the door assembly is locked in its closed position preventing the animal from exiting from housing 12.

Door assembly 22 can be reset in its open position to reset the trap or to release the animal by manually pivoting the door assembly clockwise after releasing latch pin 50 from latches 90 by pivoting latches 90 counterclockwise. Continued clockwise pivoting of door assembly 22 will cause latch pin 50 to engage cam surfaces 88 of down lock latches 66 pivoting such latches clockwise to an extent sufficient to engage latch pin 50 and notches 72, thereby locking the door assembly in its open position.

While various embodiments have been chosen to illustrate the invention, it will be understood by those skilled in the art that various changes and modifications can be made therein without departing from the scope of the invention as defined in the appended claims.

What is claimed is:

1. A tunnel trap, comprising:
    an elongated tubular housing defining an interior space and having front and rear ends, said housing having a lateral side with an opening;
    a rear cover coupled to said housing for closing said rear end;
    a door pivotally mounted in said housing adjacent said front end for movement between an open position permitting access to said housing interior space through said front end and a closed position closing said housing adjacent said front end, said opening receiving said door in said open position;
    spring means, coupled to said door, for biasing said door toward said closed position;
    first latch means, releasably engageable with said door, for maintaining said door in said open position against the bias of said spring means, said door comprising support member fixed to said housing lateral side adjacent said opening, a pair of door brackets pivotally coupled to said support member about a first pivot axis, said brackets having a latch member attached directly thereto matable with said first latch means, said latch member extending parallel to and spaced from said first pivot axis, and a door panel mounted on said brackets; and
    trigger means, coupled to said first latch means, for moving said first latch means to a release position releasing said door for movement to said closed position under action of said spring means.

2. A tunnel trap according to claim 1 wherein said trigger means comprises electrical switch means, mounted in said housing, for generating an electrical signal upon detection of game in said housing.

3. A tunnel trap according to claim 2 wherein said electrical switch means comprises a pressure sensitive membrane switch.

4. A tunnel trap according to claim 2 wherein said trigger means comprises a solenoid electrically coupled to said switch means and mechanically coupled to said first latch means, such that activating said switch means causes said solenoid to move said first latch means to said release position.

5. A tunnel trap according to claim 1 wherein said trigger means comprises
    a pressure-activated electrical switch;
    a solenoid electrically coupled to said switch and mechanically coupled to said first latch means; and
    an electrical power supply electrically coupled to said switch and said solenoid;
    whereby actuation of said switch causes said solenoid to move said first latch means to said release position.

6. A tunnel trap according to claim 1 wherein said door, in said open position, conforms to the shape of said interior space.

7. A tunnel trap according to claim 1 wherein said housing is in the shape of a right cylinder; and said door is formed from said lateral side of a section removed from said housing.

8. A tunnel trap according to claim 1 wherein said latch member comprises a pin extending between said brackets.

9. A tunnel trap according to claim 1 wherein a second latch means releasably engages said door for locking said door in said closed position; and said first and second latch means comprise first and second latch plates, said plates being pivotally mounted on said support for movement about spaced axes.

10. A tunnel trap according to claim 9 wherein said latch plates are spring biased toward latching positions against stops fixed on said support.

11. A tunnel trap according to claim 10 wherein said latch member comprises a pin extending between said brackets and said latch plates have notches for receiving said pin.

12. A tunnel trap according to claim 1 wherein support members depend from said housing for supporting said housing on the ground.

13. A tunnel trap according to claim 1 wherein a handle is attached to said housing.

14. A tunnel trap according to claim 1 wherein said opening is spaced from both of said ends.

15. A tunnel trap according to claim 1 wherein said housing comprises a unitary, cylindrical member.

* * * * *